(12) United States Patent
Tan et al.

(10) Patent No.: US 10,612,934 B2
(45) Date of Patent: Apr. 7, 2020

(54) SYSTEM AND METHODS FOR ROBOTIC AUTONOMOUS MOTION PLANNING AND NAVIGATION

(71) Applicant: General Electric Company, Schenectady, NY (US)

(72) Inventors: Huan Tan, Clifton Park, NY (US); Lynn Ann DeRose, Gloversville, NY (US); Yi Xu, Menlo Park, CA (US); Yang Zhao, Whitestone, NY (US)

(73) Assignee: GENERAL ELECTRIC COMPANY, Schenectday, NY (US)

( * ) Notice: Subject to any disclaimer, the term of this patent is extended or adjusted under 35 U.S.C. 154(b) by 177 days.

(21) Appl. No.: 15/870,534

(22) Filed: Jan. 12, 2018

(65) Prior Publication Data

US 2019/0219409 A1    Jul. 18, 2019

(51) Int. Cl.
*G01C 21/34* (2006.01)
*G05B 19/048* (2006.01)
*G05D 1/02* (2020.01)

(52) U.S. Cl.
CPC ..... *G01C 21/3453* (2013.01); *G01C 21/3461* (2013.01); *G01C 21/3492* (2013.01); *G05B 19/048* (2013.01); *G05D 1/0212* (2013.01); *G05D 1/0214* (2013.01); *G05D 1/0246* (2013.01); *G05B 2219/40523* (2013.01); *Y10S 901/01* (2013.01); *Y10S 901/47* (2013.01)

(58) Field of Classification Search
CPC ............ G01C 21/3453; G01C 21/3492; G05B 19/048; G05D 1/0212; G05D 1/0214; G05D 1/0246

USPC .......................................................... 701/28
See application file for complete search history.

(56) References Cited

U.S. PATENT DOCUMENTS

| 8,352,179 B2 * | 1/2013 | French ............... G01C 21/3453 701/410 |
| 9,205,886 B1 | 12/2015 | Hickman et al. |
| 9,239,580 B2 | 1/2016 | Asahara et al. |
| 9,452,530 B2 | 9/2016 | Sisbot et al. |
| 9,563,205 B2 | 2/2017 | Binney et al. |
| 9,709,990 B2 | 7/2017 | Deshpande et al. |
| 10,311,400 B2 * | 6/2019 | Mascorro Medina ....... G06Q 30/016 |

(Continued)

FOREIGN PATENT DOCUMENTS

| CN | 105241461 A | 1/2016 |
| CN | 106354161 A | 1/2017 |

(Continued)

OTHER PUBLICATIONS

Hiroi et al., "Building a map including moving objects for mobile robot navigation in living environments", 2012 Ninth International Conference on Networked Sensing (INSS), pp. 1-2, Antwerp, 2012.

(Continued)

*Primary Examiner* — Yazan A Soofi
(74) *Attorney, Agent, or Firm* — Fletcher Yoder, P.C.

(57) ABSTRACT

The present approach relates to navigation (e.g., route planning and movement) of robots in an indoor environment shared with humans. The present approach includes detecting human activity over time, including but not limited to human motion; modeling human activities using the historical human activity, and using the modeled human activity to plan robotic motion or movement.

16 Claims, 7 Drawing Sheets

(56) References Cited

U.S. PATENT DOCUMENTS

| | | | | |
|---|---|---|---|---|
| 10,387,536 | B2* | 8/2019 | Govrin | G06F 17/20 |
| 2002/0165790 | A1* | 11/2002 | Bancroft | G06Q 10/063 |
| | | | | 705/7.29 |
| 2004/0263388 | A1* | 12/2004 | Krumm | G01C 21/206 |
| | | | | 342/451 |
| 2013/0184980 | A1* | 7/2013 | Ichikawa | B25J 9/1676 |
| | | | | 701/301 |
| 2013/0345966 | A1* | 12/2013 | Horvitz | G01C 21/3492 |
| | | | | 701/423 |
| 2014/0222433 | A1* | 8/2014 | Govrin | G06Q 40/02 |
| | | | | 704/260 |
| 2015/0230060 | A1 | 8/2015 | Sung et al. | |
| 2016/0114488 | A1* | 4/2016 | Mascorro Medina | |
| | | | | B25J 9/1697 |
| | | | | 700/259 |
| 2016/0253740 | A1* | 9/2016 | Goulart | G06Q 30/0635 |
| | | | | 705/26.8 |
| 2016/0284221 | A1 | 9/2016 | Hinkle et al. | |
| 2017/0323376 | A1* | 11/2017 | Glaser | G06Q 30/0643 |
| 2018/0246520 | A1* | 8/2018 | Martinson | G05D 1/0094 |

FOREIGN PATENT DOCUMENTS

| | | |
|---|---|---|
| WO | 2011019445 A1 | 2/2011 |
| WO | 2016048238 A1 | 3/2016 |

OTHER PUBLICATIONS

Limosani et al., "Enabling Global Robot Navigation Based on a Cloud Robotics Approach", International Journal of Social Robotics, pp. 371-380, vol. 8, Issue: 3, Jun. 2016.

International Search Report; PCT/US2018/056827 dated Jan. 31, 2019; 3 pages.

* cited by examiner

FIG. 6

| | | | | | | | | | |
|---|---|---|---|---|---|---|---|---|---|
| 1 | ○ $K_2$ | 1 | 1 | 1 | 1 | 1 | 1 | 1 | 1 |
| 1 | 1 | 1 | 1 | 1 | 1 | 1 | 1 | ○ $K_3$ | 1 |
| 1 | 1 | $G_k(2)$ | 1 | 1 | 1 | 1 | 1 | 1 | 1 |
| 1 | $G_k(2)$ | $G_k(2)$ | $G_k(2)$ | 1 | 1 | 1 | 1 | 1 | 1 |
| 1 | $G_k(2)$ | $G_k(2)$ | $G_k(2)$ | 1 | 1 | 1 | 1 | 1 | 1 |
| 1 | 1 | 1 | 1 | $G_k(5)$ | $G_k(5)$ | $G_k(5)$ | $G_k(5)$ | 1 | 1 |
| 1 | 1 | 1 | 1 | 1 | 1 | 1 | 1 | 1 | 1 |
| 1 | 1 | $i_k(3)$ | $i_k(3)$ | 1 | 1 | 1 | $G_k(4)$ | $G_k(4)$ | $G_k(4)$ |
| 1 | 1 | $i_k(3)$ | $i_k(3)$ | $i_k(3)$ | 1 | ○ $K_1$ | $G_k(4)$ | $G_k(4)$ | $G_k(4)$ |
| 1 | 1 | $i_k(3)$ | $i_k(3)$ | 1 | 1 | 1 | 1 | 1 | 1 |

160

SYSTEM AND METHODS FOR ROBOTIC AUTONOMOUS MOTION PLANNING AND NAVIGATION

STATEMENT REGARDING FEDERALLY SPONSORED RESEARCH & DEVELOPMENT

This invention was made with Government support under contract number VA118-12-C-0051. The Government has certain rights in the invention.

BACKGROUND

The subject matter disclosed herein relates to task planning and navigation of a robot in an occupied environment.

Various entities may employ robots or other autonomously controlled devices in an indoor environment or other environment in which humans also are present. For example, such devices may be employed to move or deliver items within the environment, to clean or inspect portions of the environment, or to operate instrumentation or equipment within the environment.

In such contexts, conventional applications may employ a real-time sensing to allow the robot or similar device to determine the presence and/or location of humans in the environment in real-time and to react to avoid contacting the sensed humans. Such real-time sensing and avoidance, however, may be computationally intensive and may impact the computational resources of the device (e.g., robot). In addition, sense and react approaches, while suitable for dealing with immediate surroundings, may be poorly suited for task and/or motion planning in the context of overall planning, as opposed to reaction.

BRIEF DESCRIPTION

In one embodiment, a robot navigation system is provided. In accordance with this embodiment, the robot navigation system includes: a sensor network configured to generate historical human activity data within an environment over time, and one or more processor-based systems configured to receive the historical human activity data and to derive path data between a plurality of locations within the environment based on the historical human activity data. The robot navigation system further includes: a robot configured to perform one or more tasks within the environment, the robot comprising: one or more sensors, and a processing component configured to: receive the path data generated from the historical human activity data; generate, for a respective task, a plurality of waypoints using the path data; cause the robot to move along the waypoints sequentially and perform specified actions at some or all of the waypoints; and make adjustments to the movement along the waypoints by the robot in response to real-time sensed data acquired by the one or more sensors present on the robot.

In a further embodiment, a method for navigating a robot in an environment shared with humans is provided. In accordance with this method, historical human activity data is acquired within an environment over time. Path data between a plurality of locations within the environment is derived based on the historical human activity data. Then, on the robot: the path data generated from the historical human activity data is received; a plurality of waypoints corresponding to a task to be performed are generated based on the path data; the robot is moved along the waypoints sequentially and specified actions are performed at some or all of the waypoints; and adjustments are made to the movement along the waypoints by the robot in response to real-time sensed data acquired by one or more sensors present on the robot.

In an additional embodiment, a robot is provided. In accordance with this embodiment, the robot includes: one or more sensors; a driving system comprising a motor; and a processing component. The processing component if configured to: receive path data from an external source, wherein the path data is generated from historical human activity data; generate, for a respective task, a plurality of waypoints using the path data; communicate instructions to the motor to cause the robot to move along the waypoints sequentially; and make adjustments to the movement along the waypoints by the robot in response to real-time sensed data acquired by the one or more sensors present on the robot.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 depicts an example of a cost map, in accordance with aspects of the present disclosure.

DETAILED DESCRIPTION

Figure 1:
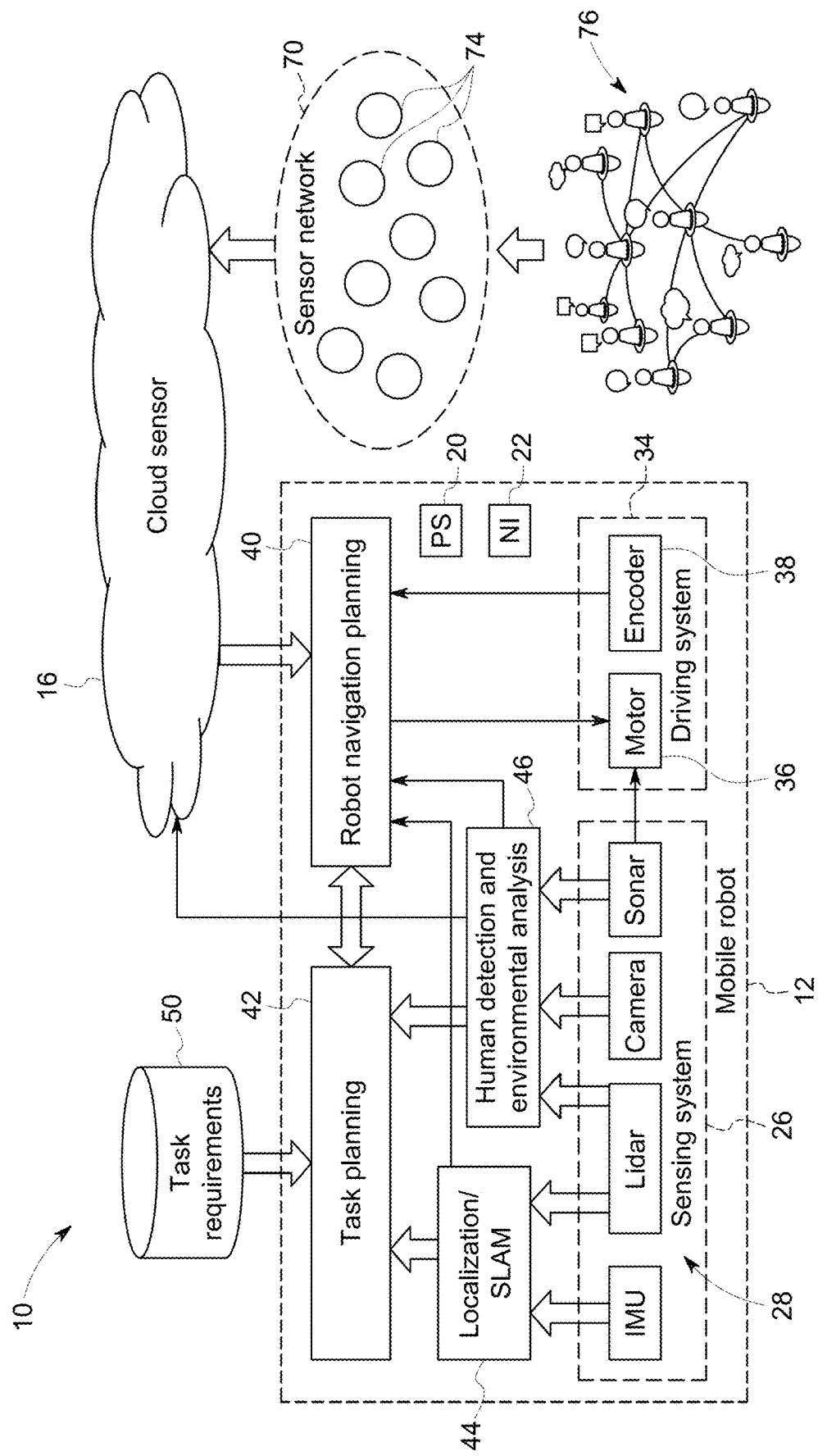
FIG. 1 is a schematic of a robot and networked environment, in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Further-more, any numerical examples in the following discussion are intended to be non-limiting, and thus additional numerical values, ranges, and percentages are within the scope of the disclosed embodiments.

As discussed herein, robots or robotic devices may be operated in an indoor environment to move along a path in the performance of actions or tasks, such as delivering or moving items, performing custodial tasks, performing security or monitoring functions, and so forth. In particular, aspects of the present approach facilitate the navigation (e.g., route planning and movement) of such robots in a shared indoor environment with humans in a safe, robust, and efficient manner. Several issues are addressed by the present approach, including issues related to: detecting human activity, including but not limited to human motion; modeling human activities and incorporating the modeled human activity into planning robotic motion or movement; planning robotic motion or movement in a complex indoor environment, including environments having more than one floor or level; and the combination of global route planning and local reactive planning or adjustment.

With the preceding in mind, the approach may be characterized as having two aspects: modeling of human activity modeling and planning hybrid motion. With respect to human activity modeling, in one implementation a network or internet-connected server (e.g., a cloud server) is connected to one or more sensor positioned so as to sense human activity in the indoor environment in question, such as in a building of interest, to continuously or periodically collect human activity data. Such a sensor network may be adjusted or reconfigured based on the data obtained during the system operation. Based on the collected data, routines executed on the server can generate a model of the environment incorporating the observed human activity and/or trends discernible in the human activity (e.g., trends or relationships observed in human activity at given locations at different times and/or dates, directional or flow characteristics of human motion or activity each location and/or at different times, and so forth). In one implementation, such a model may incorporate the concept of "cost", and potential paths or motion of the robot may be evaluated, suggested, and/or selected based on their cost as determined by the model. For example, the higher the cost value associated with a region or location, the less desirable it would be to move the robot into that region. That is, in such an implementation, paths may be selected or suggested based on cost minimization. In one embodiment, a graph may be constructed to describe such "cost" across all floors of interest in a building and the graph may be used to plan the motion of one or more robots.

With respect to the second aspect, a robot or server in communication with the robot may employ the cost graph to plan motions for the robot to allow the robot to perform one or more tasks at an acceptable motion cost (such as the lowest motion cost), as determined from the graph. In such a context, the graph gives the robot information about the global environment and probabilistic expectations related to human traffic and movement. In executing the motion plan determined using the graph, real-time sensing using sensors on the robot may be employed to detect or otherwise sense the nearby environment. In this manner, local reactive motions and/or avoidance may be performed. Connection to the cloud server to get both the historical graph data and the latest, i.e., most recent, sensor data helps the robot to optimize its planning both locally and globally.

As used herein, the terms robots or robotic devices include, but are not limited to, ground-based mobile robots, including those with legs, wheels, tracks, etc. Such devices may also include actuators or other movable components (e.g., grippers, arms, and so forth) that are also programmable and movable to perform tasks. It should be understood that devices characterized as robots herein encompass any suitable autonomously moving devices that are capable of programmable movement with no or limited human oversight or of remote control by an automated system or controller. Such programmable movement, when employed, can be based on either locally generated path waypoints or guidance or path guidance and waypoints generated by a remote system (e.g., a server or controller) and communicated to the robot. Thus, as used herein, such devices move during an operational phase or period entirely or primarily without direct human intervention or control or with limited or partial human intervention or oversight. Though ground-based robots are primarily discussed herein, the present approaches may also be relevant to navigation and and/or task planning in the context of unmanned aerial vehicles (UAVs), including fixed wing and rotary wing vehicles as well as, unmanned submersible vehicles (USVs), which may swim or move along the floor of the body of liquid within the context of the teachings of the present discussion, such as in a monitored or closed environment shared with humans.

Further, to the extent the term "path" is used herein, it should be appreciated that this term encompasses one-dimensional (1D) (such as along a track), two-dimensional (2D) (such as along a defined or undefined planar route), three-dimensional (3D) (such as movement in the air or generally along a plane but incorporating vertical elements, including stairs, elevators, conduits, and so forth), or four-dimensional (4D) (such as where there are defined temporal aspects that may characterize a velocity, acceleration, or a time on station at a waypoint) aspects. Such as path, as used herein relates to a route or other movement plan along which a robot moves as part of performing one or more tasks as part of an automated or semi-automated process. Thus, a "path" as used herein may be characterized as any 1D, 2D, 3D, or 4D route or path along which a device such as a robot is moved to perform one or more assigned tasks. Such a path may be adaptive, such as dynamically adapting in response to sensor data acquired by the robot of the local environments in real- or near real-time, and may consist of one or more waypoints along which the robot proceeds in an ordered fashion, with the sequence and location of the waypoints defining the path or route. It should be appreciated that such a path may also incorporate not only temporal and/or spatial locations, but also action instructions to be taken at points and/or times defined on the path, such as pushing an elevator button, opening a door, and so forth.

To facilitate explanation and provide useful real-world context, various examples of indoor environments may be referenced herein, such as offices, schools, hospitals factories, and so forth. As may be appreciated however, the present approach may be broadly applicable to any closed and/or monitored space in which both humans and robots are present and in which sensors may be employed to monitor traffic and motion patterns over time. Thus, any examples described herein are provided merely to facilitate explanation, and the present approach is suitable for use in any indoor or similar environment as described herein. The present approach, therefore, is not intended to be limited to the context of the present examples.

With the preceding in mind, and turning to the figures, FIG. 1 depicts aspects of a robot navigation system 10 employing one or more robots 12 suitable for performing tasks in an indoor environment shared with humans. In the depicted example a remote server or servers accessible via a network interface (e.g., cloud server 16) are also depicted. Such network or cloud-based computing may be used for accessing one or more remote servers, virtual machines, etc. for storage, computing, or other functionality as described herein. Such servers 16 may communicate with the one or more robots 12 to coordinate operation of one or more robots 12, such as for navigating an environment shared with humans to perform one or more tasks.

Though only a single remote server 16 is shown in FIG. 1, it should be understood that the functions performed by the remote server 16 may be performed by multiple remote servers 16 and/or by virtualized instances of a server environment. In various implementations, the remote server 16 includes a data processing system, which may include a memory component and a processor for processing data received from the robot 12 and/or instructions to be relayed to the robot 12. As is described in more detail below, in some embodiments, the robot 12 may provide sensor data to the remote server 16 to convey information about the environment currently sensed by the robot 12, which may be relevant to the navigation of the robot 12 and/or task performance by the robot 12.

In one embodiment, the robot(s) 12 have onboard cellular or network connectivity and can communicate with a remote server 16 prior to beginning, during, and/or after performing one or more tasks. In certain implementations the cellular or network connectivity of the robot(s) 12 allow communication during task performance, allowing data acquired while performing a respective task (e.g., sensor data) to be communicated to the remote server 16 and/or allowing the remote server 16 to communicate instructions to a given robot 12. In some instances, changes to a path may be determined by a processor internal to the robot 12, i.e., onboard, such as in the event the robot 12 is operating outside of communication range from the remote server 16 or in response to other communication interruptions.

Turning back to FIG. 1, certain details of the task performance and navigation system 10 will be described in greater detail. For example, FIG. 1, depicts a schematic of one embodiment of a robot 12. It should be understood, however, that other embodiments of the robot 12 are envisaged having additional components, fewer components, and/or different combinations of components. As shown, the robot 12 includes a power supply 20 to provide power for the operation of the robot 12. The power supply 20 may include a replaceable or rechargeable battery, a combustion engine, a generator, and electric motor, a solar panel, a chemical-reaction based power generation system, etc., or some combination thereof.

The robot may include a user interface, by which a user may set up or adjust various settings of the robot 12. The user interface may include one or more input devices (e.g., knobs, buttons, switches, dials, etc.) and in some cases may include a display (e.g., a screen, array of LEDs, etc.) for providing feedback to the user.

A network interface 22 enables communication with the remote server 16 (such as via the cloud) or other devices (e.g., a docking station, a remote controller, a smart phone, a computing device, a tablet, etc.). For example, the network interface 22 may enable communication via a wireless network connection, a wired network connection, cellular data service, Bluetooth, Near Field Communication (NFC), ZigBee, ANT+, or some other communication protocol.

A sensing system 26 may include one or more sensors 28 (e.g., tactile sensors, chemical sensors, methane sensors, temperature sensors, laser/LIDAR, sonar, cameras, a red, blue, green, depth (RGB-D) cameras, inertial measurement units (IMU), etc.) configured to sense various qualities and collect data during navigation of the robot 12 and/or performance of a task by the robot 12. The sensors 28 may be used to acquire sensed data corresponding to the sensor type and observation range that conveys information about the environment where the robot 12 is located.

A drive system 34 may actuate movement of the robot 12 along a surface, through the air, and so forth. As shown, the drive system 34 may include one or more motors 36 and one or more encoders 38. The one or more motors 36 may drive propellers, legs, wheels, tracks, etc. The one or more encoders 38 may sense one or more parameters of the one or more motors 36 (e.g., rotational speed) and provide data to a control system.

The control system may include one or more memory components and one or more processors. A motion control system may receive a signal from the one or more encoders 38 of the drive system 34 and output a control signal to the one or more motors 36 to control the movement of the robot 12. Similarly, a data collection control system may control the operation of the sensing system 26 and receive data from the sensing system 26. The communication interface between the sensors 28 and the on-board processor may be a standard industrial interface, including parallel bus, serial bus (I2C, SPI), and USB. A data processing and analysis system may receive data collected by the sensing system 26 and process or analyze the collected data. In some embodiments, the data processing and analysis system may process and analyze the data to different extents, such as based on a sensor modality and/or based on task or navigation specific considerations.

With the preceding examples of sensor and drive components, in one such example, the Lidar and/or encoder may be used in localization of the robot 12 (i.e., accurately locating the robot 12 within the environment), while other sensors (e.g., cameras, including RGB and infrared, are used to collect the environmental information. In certain implementations RGB-D sensors are used to enhance the performance of the sensing system 26 and reduce the computing cost.

In the depicted example, the robot 12 is also depicted as including sub-systems for, and/or executing processor-implemented algorithms for, robot navigation planning 40, task planning 42, localization/SLAM (simultaneous localization and mapping) 44, and/or human detection and environmental analysis 46. Such sub-systems and/or algorithms may be provided as part of the control system or in communication with the control system and are described in greater detail below. As shown in FIG. 1, external factors or parameters, such as task requirements 50, communications to or from one or more remote servers 16, and so forth may also be encompassed by the system 10.

In addition to the robot 12, another aspect of the robot navigation system 10 shown in FIG. 1, is the sensor network 70, which may be managed by and/or in communication with the remote server(s) 16 (e.g., cloud server(s)). In one implementation, the sensor network 70 collects human activity data (represented by reference number 76) in the environment navigated by the robot 12 and sends the data to the remote server 16. The sensor network 70 may be run and updated continuously or periodically to collect human activity data 76 in the environment over time. In one implementation, the sensor units 74 in the sensor network 70 are not fixed but may be moved, adjusted, added, removed, and so forth as needed.

By way of example, in one embodiment some or all of the sensors 74 may be RGB-Depth (RGB-D) cameras that acquire and provide both RGB and depth information to generate a point cloud of the observed environment. The RGB textures may be mapped on the point cloud to generate 3D models of the sensed environment. In such a context, human activity 76 in the shared environment can be tracked continuously using the RGB-D sensors, allowing the positions and orientations of the joints of the human skeletons to also be obtained over time. Based on the gestures and/or other motion data that can be determined from this data using the derived skeletons, human motion activity can be determined in the shared environment over an extended time period. In addition to or instead of RGB-D sensors, other types of sensors 74 may be employed to track human activity 76. For example, sensors 74 such as Lidar, sonar, radar, Doppler sensors, RGB cameras, and so forth may be used in addition to or instead of RGB-D cameras, though such sensors may be limited to providing human activity data in the form of location information of humans over time as opposed to motion data derived from derived human skeleton data.

As shown in FIG. 1, the data acquired by the sensor network 70 may be forwarded to the remote server(s) 16. As discussed herein, the sensor data acquired over time may be used to model human activity in the monitored environment (i.e., an environment shared by humans and at least one robot 12). Such modeling of human activity may allow human activity to be characterized based on one or more of location, time, or other temporal trend pattern (e.g., weekly patterns, monthly patterns, and so forth).

With the preceding in mind, it may be noted that various aspects of the system 10 may relate to components or devices that process sensors data and/or execute routines or algorithms to model such data or perform navigation functions in a shared environment. Before providing additional detail into operation of the system 10, it may be beneficial to briefly provide an example of aspects of a processor-based system 90 that may correspond to components or features found in one or both of a robot 12 and/or remote server 16. For example, turning to FIG. 2, such devices or systems may contain components as shown in the figure, which depicts a block diagram of example components of a computing device 90 that could be present in a remote server 16, robot 12, or workstation or device in communication with other devices of the system 10. As used herein, a computing device 90 may be implemented as a robot 12 or as one or more computing systems, including laptop, notebook, desktop, tablet, or workstation computers, as well as server type devices or portable, communication type devices, such as cellular telephones, and/or other suitable computing devices.

As illustrated, the computing device 90 may include various hardware components, such as one or more processors 92, one or more busses 94, memory 96, input structures 98, a power source 100, a network interface 102, a user interface 104, and/or other computer components useful in performing the functions described herein.

The one or more processors 92 are, in certain implementations, microprocessors (e.g., CPUs, GPUs, and so forth) configured to execute instructions stored in the memory 96 or other accessible locations. Alternatively, the one or more processors 92 may be implemented as application-specific integrated circuits (ASICs), field-programmable gate arrays (FPGAs), and/or other devices designed to perform functions discussed herein in a dedicated manner. As will be appreciated, multiple processors 92 or processing components may be used to perform functions discussed herein in a distributed or parallel manner.

The memory 96 may encompass any tangible, non-transitory medium for storing data or executable routines (including routines and/or algorithms for performing the human activity modeling, path finding, and/or cost minimizing steps discussed herein), including volatile memory, non-volatile memory, or any combination thereof. Although shown for convenience as a single block in FIG. 2, the memory 96 may actually encompass various discrete media or types of media in the same or different physical locations. The one or more processors 92 may access data in the memory 96 via one or more busses 94.

The input structures 98 are used to allow a user to input data and/or commands to the device 90 and may include mice, touchpads, touchscreens, keyboards, VR controllers, motion or optical sensors, microphones, and so forth. The power source 100 can be any suitable source for providing power to the various components of the computing device 90, including line and battery power. In the depicted example, the device 90 includes a network interface 102. Such a network interface 102 may allow communication with other devices on a network using one or more communication protocols. In the depicted example, the device 90 includes a user interface 104, such as a display configured to display images or data and/or speakers configured to play sound or acoustic data provided by the one or more processors 92.

Figure 2:
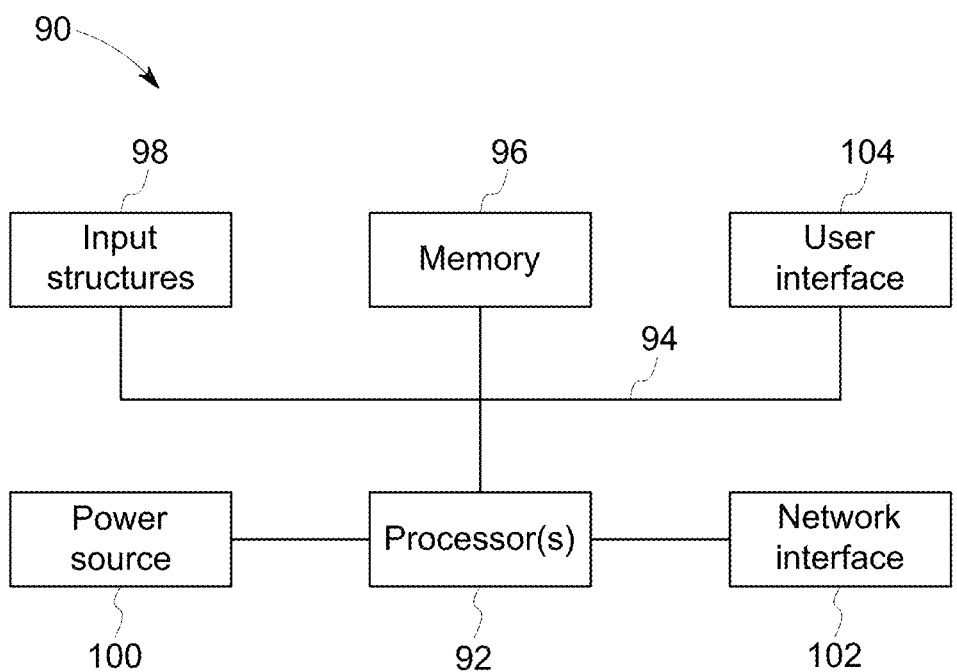
FIG. 2 is a block diagram of a processor based system suitable for use with the task planning and navigation system of FIG. 1, in accordance with aspects of the present disclosure.

As will be appreciated, in a real-world context a processor-based system, such as the computing device 90 of FIG. 2, may be employed to implement some or all of the present approach, such as performing the functions of a remote server 16 and/or robot 12 shown in FIG. 1 or other processing devices used operating or monitoring a robot 12 that navigates in a shared environment.

With the preceding comments in mind, and returning to FIG. 1, the interrelationship and operations of the various components introduced above will be discussed. As described herein, the system 10 is a navigation system used to navigate a mobile robot 12 between different working locations within an environment shared with humans. One or several computers may be used to provide on-board computing resources for the robot 12 to process sensed data (such as from the sensing system 26), plan motions, make decisions, and to otherwise control the robot and any manipulator (e.g., manipulator arms) present on the robot 12.

To facilitate such navigation, a first aspect of the present approach detects human motion and activity using the sensor network 70. In one embodiment, one or more heat maps are generated (such as at remote server 16) using the human activity data acquired by the sensor network 70.

In one such implementation, the heat maps describe long-term human activities from which human movement and traffic patterns may be determined. Such patterns may then be used in providing navigation instruction to the robot 12 in furtherance of the robot 12 performing an assigned task. For example, the patterns may be used to determine a route for the robot 12 to travel to perform a task that limits or minimizes the likelihood of human interaction or presence.

With this in mind, in one embodiment, the sensor 74 are placed in the environment to be navigated for a sufficient time (e.g., a day, a week, two weeks, a month, six, months, a year, and so forth) to record human locations with temporal information in sufficient detail to determine human movement and traffic patterns. The duration of this process depends on the situational environment (e.g., low versus high traffic, 24 hour versus 12 hour occupancy, and so forth) and the requirements of the applications, such as the extent to which human presence is acceptable for task performance by the robot 12. For example, in one implementation sensors 74 may be placed in the environment for one week to collect weekly-based data, which allows variations specific to hours-of-the-day and days-of-the-week to be determined. Such a scheme may be particularly useful human activities that have some trackable patterns discernible within a weekly time frame.

Figure 3:
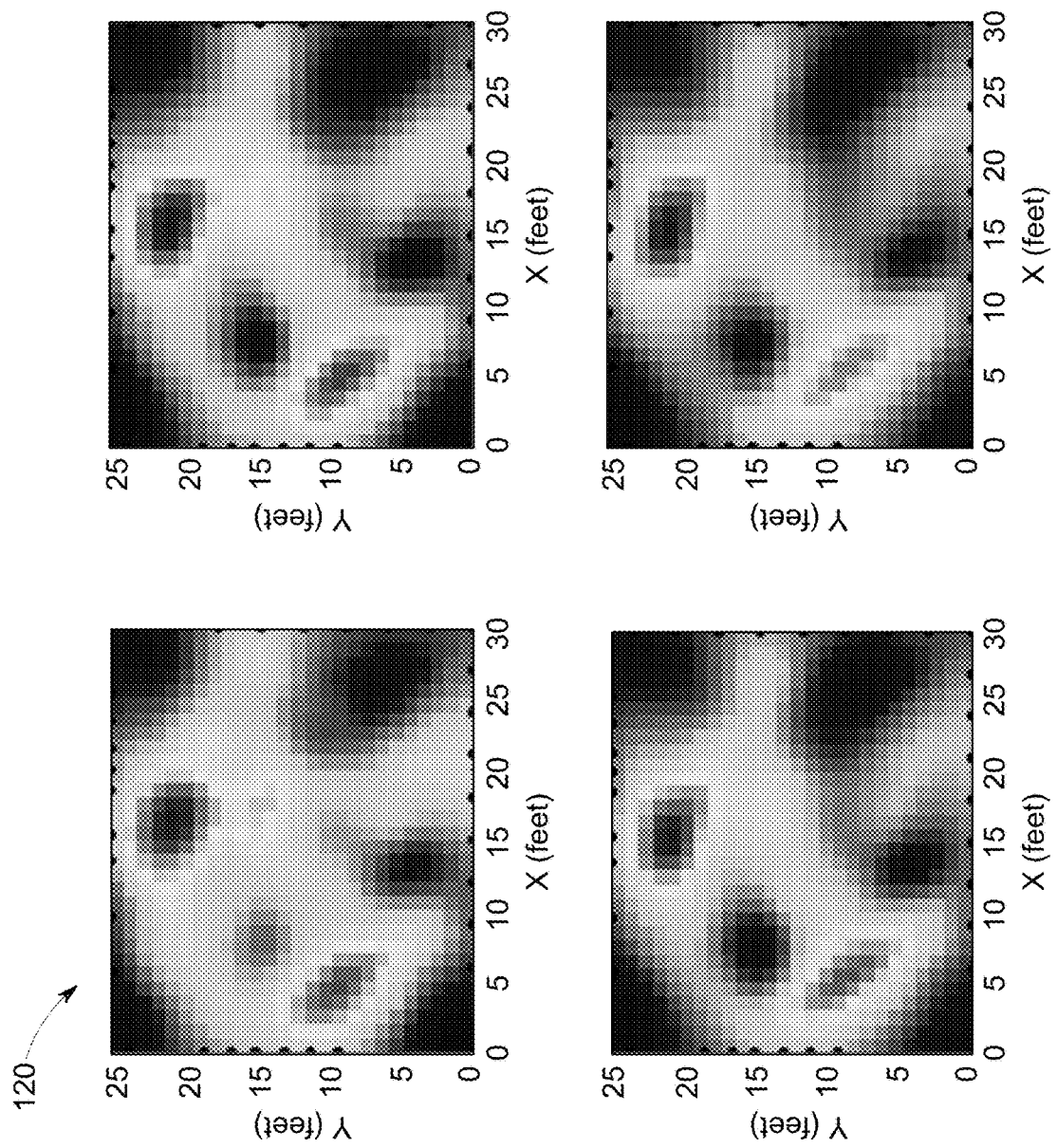
FIG. 3 depict examples of heat maps depicting human activity, in accordance with aspects of the present disclosure.

Turning to FIG. 3, an example of heat maps 120 generated (such as one remote server 16) based on sensor data acquired over time is depicted. The heat maps 120 convey, by color, grey-scale, or intensity, relative human motion at different spatial locations. For example, a heat map 120 such as shown in FIG. 3 may describe human activity within an environment, where the human activity data is derived from skeleton data generated from sensed data acquired using one or more RGB-D cameras within that environment.

Based on the detected human activity and/or motion, a model of human activity in the environment may be generated, such as at remote server 16. In one implementation, to simplify the modeling process, a Gaussian Mixture Model (GMM) is used to model the locations corresponding to human activity. The 'hot' or high activity locations are described as Gaussian models whose center are the peak points of human activities that happen every day. For example, such peak points of human activity may correspond to public or communal spaces in the environment, such as elevators, stairs, entry/exit doorways, hallways, conference rooms, lobbies, restrooms, cafeterias, and so forth. Mathematically, the location of each Gaussian model is described as:

$$G_k(j) = \{(x, y), \sigma\} \quad (1)$$

where k represents the $k^{th}$ floor, j is the index number of the Gaussian model on the $k^{th}$ floor, (x, y) is the location of the center of the Gaussian model with respect to the local coordinates of the $k^{th}$ floor, and $\sigma$ is the variance.

Figure 4:
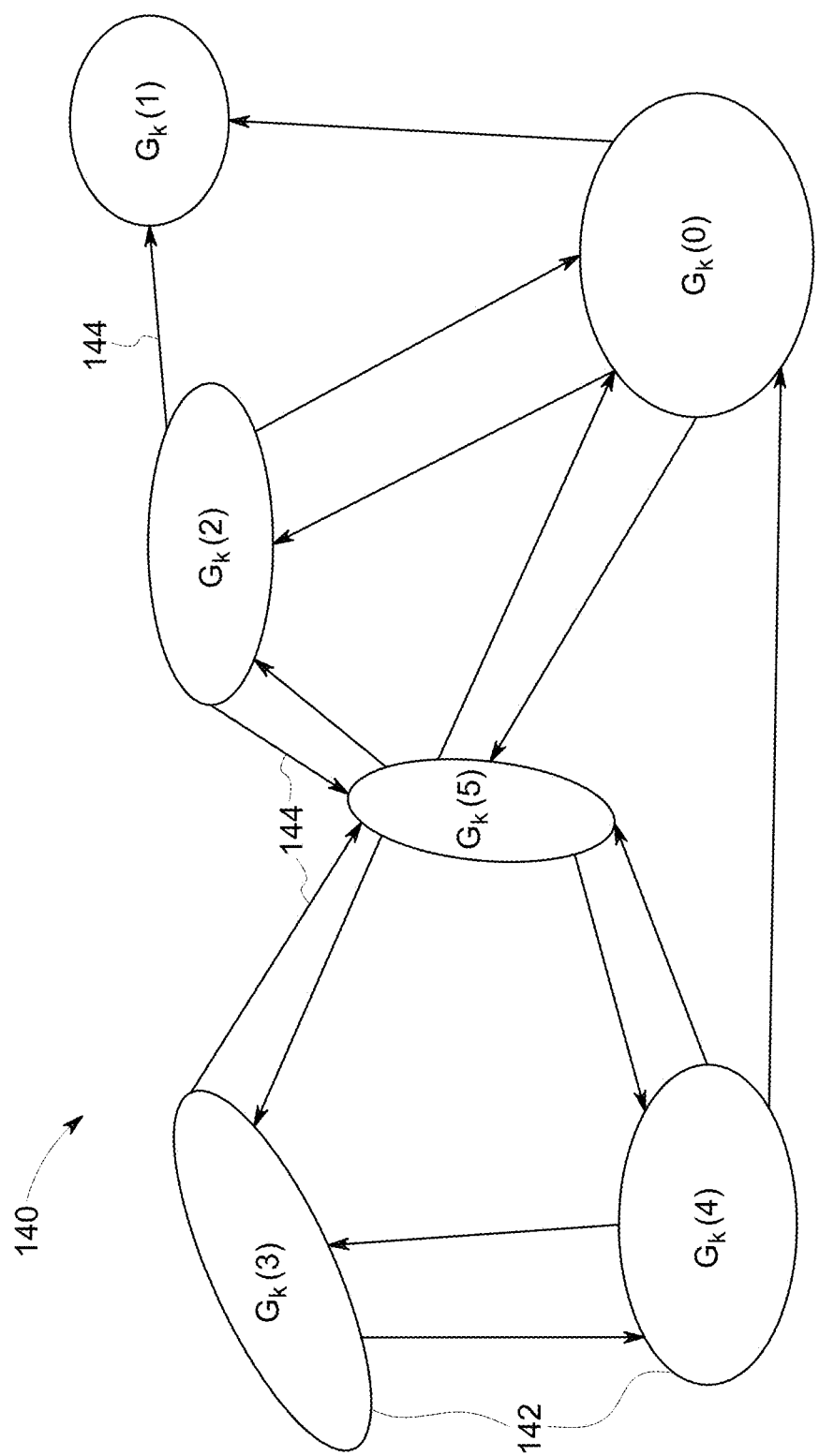
FIG. 4 depicts an example of a Hidden Markov Model depicting human activity, in accordance with aspects of the present disclosure.

In one implementation, a Hidden Markov Model (HMM) is generated based on the temporal information (e.g., the time or data and time associated with the respective human activity location data). The HMM model describes the relationship between each location including, when a human is within an area described using Gaussian model, where he/she will move to. An example of a HMM 140 built in accordance with the present approach is shown in FIG. 4. As shown in FIG. 4 the indexed Gaussian models $G_k(j)$ (indicated by reference number(s) 142) corresponding to various locations of human activity are shown along with directional arrows 144 indicative of the relationship between each model 142 based on the flow or movement of humans between locations.

Once the high activity areas have been determined, based on the human activity detection process discussed herein, a map or graph may be generated based on this information to describe the environmental information at a given time per the modeled location and time data. In one such embodiment, the map or graph conveys the "costs" associated with movement between different modeled locations at a time of interest, such as a current time. Such costs may then be employed in path finding, such as by minimizing a cost function, which may allow a path to be determined for navigation of the robot 12 so as to limit movement through locations having high human movement or presence.

In the context of the preceding examples, Gaussian models may be used to describe human activities at high activity locations in the environment. However, it is not necessary to use all of the models (i.e., modeled locations) in the global shortest path searching operation. Instead, in a cost-based approach, the parameter of interest is the cost between key locations, not all the locations. For example, in one implementation, the key locations may include (but are not limited to): (1) elevators and stairs, which connect two floors, and (2) target locations, which may not be the high activity locations detected as described herein, but to which the robot needs to move in order to perform an assigned task.

Figure 5:
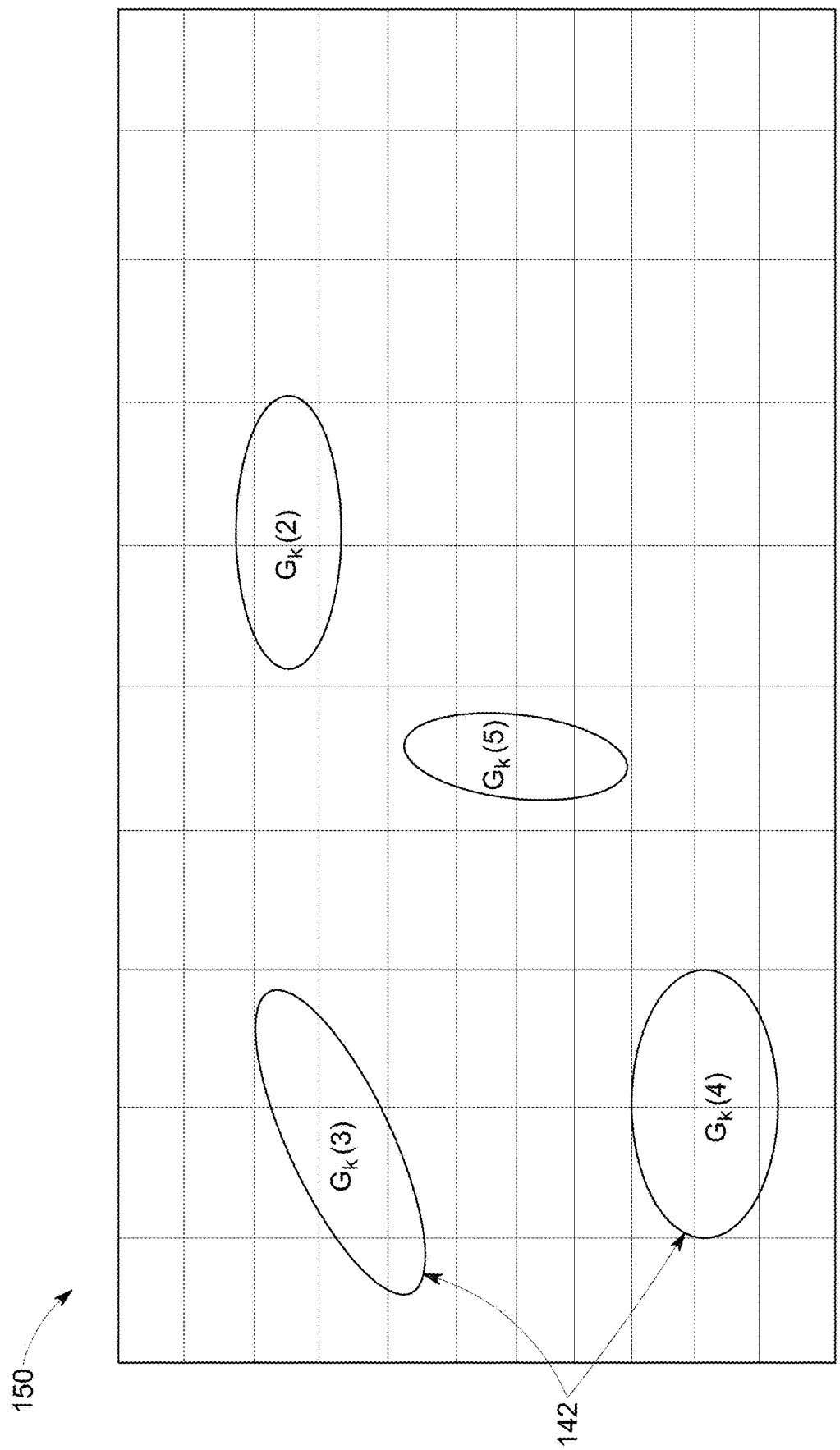
FIG. 5 depicts an example of a human activity map, in accordance with aspects of the present disclosure.

In one approach, the free space of a static map may be segmented into a grid. High activity areas identified as discussed herein may then be overlaid or otherwise represented on the static, grid-based map (i.e., overlay map 150), as shown in FIG. 5. In one such example, the cost of moving from one grid to an adjacent free grid is 1, and the cost of moving from one grid to an adjacent impedance (i.e., high activity) grid (i.e., c(i,j) is defined using the following equation:

$$c(i,j) = \eta * (\text{impedance}_{current} + 1) + (1 - \eta) \text{impedance}_{history}(t) \quad (2)$$

where impedance$_{current}$ is defined by the number of people present at the location. And impedance$_{history}$ is defined by the number of people detected at time t at the location from the historical data.

Based on these costs, c(i,j), a cost map, e.g., a Reactive Key Cost Map, may be generated for each floor. An example, of one such cost map 160, generated from the overlay map 150 of FIG. 5, is illustrated in FIG. 6. As previously noted, the path between each location may not be necessary. However, the cost of paths between key locations does need to be determined.

Often a target location of a navigation task is a public space (e.g., a conference room, an office, and so forth), which may not be close to the key locations. With this in mind, before generating a cost graph, an additional key location may be built into the cost map 160. Once the cost map 160 is generated, the closest neighbors are connected to the target node and the cost is computed using the Gaussian impedance area:

$$c(i,t) = \text{impedance}(i) * N(x | x_i, \Sigma) \quad (3)$$

where x is the target location, $x_i$ is the center of the Gaussian impedance area, and $\Sigma$ is the variance matrix. A path searching algorithm is then applied to find the shortest paths between all the key locations on each floor. In one implementation, the A* algorithm may be employed, since the map is known and the heuristic and current cost are all known. Specifically, the A* path searching algorithm selects the path that minimizes:

$$f(n) = g(n) + h(n) \quad (4)$$

where n is the last node on the path, g(n) is the cost of the path from the start node to n, and h(n) is a heuristic that estimates the cost of the cheapest path from n to the goal.

The path that is determined in this manner may then be communicated to the robot 12 to follow in order to perform an assigned task, or, in other embodiments, steps or actions along the path may be communicated to the robot 12, as opposed to the complete path, to facilitate task performance.

In addition to the global path finding process discussed above, and turning back to FIG. 1, other functionality may be provided or performed by the robot 12 to facilitate task performance and/or navigation in an environment shared with humans. For example, localization of the robot 12 within the environment is also an aspect of the navigation of the robot 12. In one implementation, localization/SLAM functionality (indicated by reference block 44) may be provided that uses information sensed by Lidar and IMU. In this example, a localization algorithm runs to continuously or periodically localize the pose of the robot 12 in the environment, including the position and orientation of the robot 12. In one such implementation, an environmental model is simultaneously built. In some situations, the mapping can be done before tasks are performed or begun to reduce the computing cost when the robot 12 is moving. As shown in the example of FIG. 1, the outputs of the localization algorithm (e.g., robot pose information, an environmental model, and so forth) may be provided to one or both of the task planning functionality and/or the robot navigation planning functionality.

In addition, as shown in FIG. 1, functionality may be provided on the robot 12 for human detection and/or environmental analysis 46. Unlike the human detection processes discussed herein that contribute to the global activity mapping based on time-elapsed or historical data (such as may be derived using the sensor network 70), the human detection 46 processes performed on the robot 12 may be real-time and/or local processes that detect humans (or other objects) currently in the immediate vicinity of the robot 12. By way of example, and as shown in FIG. 1, various sensors 28 of the sensing system 26 (e.g., cameras, sonar, Lidar, and so forth) may be used to detect humans or objects in the immediate vicinity of the robot 12 as the robot 12 moves along a provided path. Corrective action (e.g., stopping, turning, and so forth) may then be taken to avoid contacting a human or other environmental feature so detected by the local sensing system 26. In a further embodiment, information detected by the sensing system 26 in this manner may be provided to the remote server 16 to update the cost map 160, potentially resulting in an update or revision to the path that the robot 12 is instructed to use in the performance of a given task.

With respect to task planning 42 functionality provided on the robot 12, this aspect plans a sequence of operations for the robot 12 to perform in executing an assigned task. This planning is based on the task requirements 50 provided by human operators or the system. The output of the task planning feature may, in one implementation, be an array of class instances, where each instance represents one operation. In the description of each operation, one or more of the following may be provided: specification or selection of a manipulator or arm of the robot 12 or the base of the robot 12, determination or specification of a target configuration, a target operation, or an environmental constraint(s), and/or indication of an action performance. Outputs of the task planning feature may be provided to a robot navigation planning routine or algorithm 40.

At the navigation planning functionality 40, which may be triggered by task planning 42, waypoints on a path are planned to generate a sequence of waypoints that may correspond to or facilitate manipulation tasks to be performed at working locations. As shown in FIG. 1, navigation planning on the robot 12 may receive inputs from task planning 42, human detection and environment analysis 46, localization/SLAM 44, remote server(s) 16, encoder 38, and so forth. By way of example, a sonar sensing modality may be used to detect obstacles in the environment and to send signals to the motors 36 of the driving system 34 base to avoid obstacles either within or outside the context of navigation planning (such as in response to the sudden appearance of a human near the robot 12). Though shown as occurring on the robot 12 in FIG. 1, it should be appreciated that some or all of the navigation planning may instead occur on the remote server(s) 16, with waypoints subsequently communicated to the robot 12.

In one example, after waypoints are generated and validated, task planning 42 triggers the robot navigation planning 40 to plan the motion trajectories of the robot 12 (e.g., the robot base), such as using the A* path selection algorithm discussed herein. In this example, the planning process provides a plan for the robot 12 to navigate through all the planned waypoints and execute corresponding desired manipulation tasks at each processing locations. Instructions or commands may then be communicated to the motor 36 of the driving system 34, such as via a motion control system. The motion control system may be configured to control the position, the velocity, and/or the acceleration of the robot base. Feedback to the motion control system may be provided from one or more of the localization/SLAM subsystem, the sensing system 26, human detection and environment analysis 46, and/or encoders 38. Further, motion planning algorithms may account for not only movement of the robot base, such as via driving system 34, but also one or more manipulator, arms, or grippers of the robot 12. Examples of algorithms that may be employed in motion planning include, but are not limited to: potential field algorithms and RRT-Connect algorithms.

Figure 7:
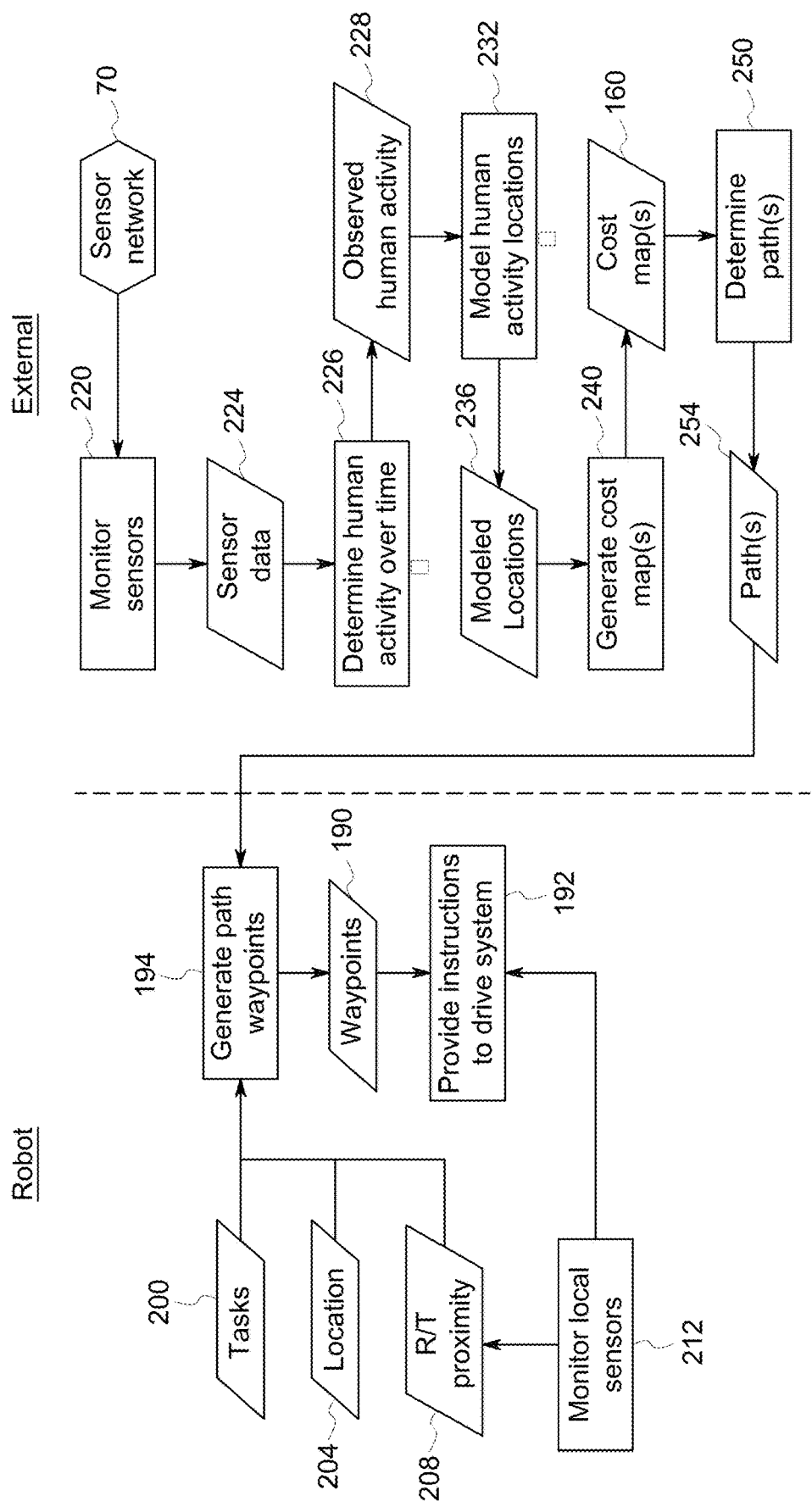
FIG. 7 depicts a process flow of steps in navigating a robot in a shared environment, in accordance with aspects of the present disclosure.

With the preceding in mind, and turning to FIG. 7, a process flow is provided of one example flow for the present approach. In the depicted flow, processes performed on the robot 12 itself are indicated on the left, while processes occurring external to the robot 12, such as on a remote server 16, are indicated on the right. In this example, navigation planning is generally depicted as occurring on the robot 12, though as noted above some or all of the navigation planning can instead occur external to the robot 12, with waypoints 190 or other path parameters so calculated being communicated to the robot 12.

Keeping in mind the discussion related to FIGS. 1-6, in the depicted process flow example, waypoints 190 corresponding to a path and tasks to be performed by the robot 12 on the path are generated and used as part of an instruction set provided (step 192) to at least the drive system 34 of the robot 12. In this example, the waypoints 190 are generated (step 194) on the robot 12. Generation of the waypoints 190 can be based on one or more tasks 200 to be performed by the robot 12, a current location 204 of the robot 12, and the real-time or current proximity 208 of objects or people to the robot 12, which may be determined by monitoring (step 212) local sensors 28 on the robot 12, such as cameras, sonar, Lidar, and so forth.

Also employed in the generation of waypoints 190 is path information that, in one embodiment, includes the shortest paths (as determined based on a cost minimization algorithm) between various key locations on each floor, as discussed above. In the present example, this process includes monitoring (step 220) a sensor network 70 provided in the environment through which the robot 12 will be navigated. The monitoring of the sensor network 70 may occur over an extended time period (e.g., one day, seven days (e.g., a work week), a week, a month, and so forth.

The sensor data 224 so acquired is used to derive or otherwise determine (step 226) indicators 228 of observed human activity over a time period of interest and/or to identify useful trends corresponding to times, days of the week, and so forth. For example, as discussed herein, one representation of human activity so derived may be a heat map 120 or similar construct.

The observed human activity 228 may in turn be used to model (step 232) human activity at various locations, such as areas of peak activity or where activity otherwise exceeds some threshold level of interest. Such modeled locations 236 may also provide information of the relationships between each location, such as traffic flow information. As discussed herein, one example of such a model may be a Hidden Markov Model (140).

The location models may be employed to generate (step 240) one or more cost maps 160 that provide an indication of the cost (based on human activity) of traveling between some of all locations of interest. Such cost maps 160 may be time and/or day specific, e.g., the cost of traveling between two locations may vary based on time and/or day. The cost maps 160 may be used with a path determination algorithm to determine (step 250) shortest or otherwise suitable paths 254 between locations (e.g., key locations) at given times and/or days. These paths 254 in turn may be provided to the robot 12 in this example to be used in the navigation process, such as in the waypoint generation process 194 depicted.

As may be appreciated from the preceding discussion, conventional online sense-plan-act algorithms may still be employed when the robot 12 is moving, such as to avoid unexpected human activity. However, the present approach substantially reduces the computing workload on the robot side. For example, the robot 12 has a model of what is happening in the environment based on a model (e.g., an HMM model) built from historical data. In such an example, this model may be used to find a path which is optimal or otherwise suitable based on the historical information, under the assumption that the current situation is similar to the historical situation during the same time every day or every week.

Technical effects of the invention include facilitating the navigation (e.g., route planning and movement) of robots in an indoor environment shared with humans. The present approach includes detecting human activity over time, including but not limited to human motion; modeling human activities using the historical human activity, and using the modeled human activity to plan robotic motion or movement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A robot navigation system, comprising:
a sensor network configured to generate historical human activity data within an environment over time;
one or more processor-based systems configured to receive the historical human activity data and to derive path data between a plurality of locations within the environment based on the historical human activity data; and
a robot configured to perform one or more tasks at a subset of the plurality of locations within the environment, wherein the sensor network is external to the robot, and wherein the robot comprises:
one or more sensors; and
a processing component configured to:
receive the path data generated from the historical human activity data, wherein the path data includes outputs of a cost function with respect to moving the robot along respective paths between the plurality of locations within the environment;
generate, based on the path data, a plurality of waypoints defining a low cost path between the subset of the plurality of locations that mitigates movement of the robot through expected locations of high human traffic within the environment;
instruct the robot to move along the plurality of waypoints sequentially and perform the one or more tasks at some or all of the plurality of waypoints; and
adjust movement of the robot along the plurality of waypoints based on real-time sensor data acquired by the one or more sensors of the robot.

2. The robot navigation system of claim 1, wherein the sensor network comprises a plurality of RGB-D cameras positioned to monitor human activity within the environment.

3. The robot navigation system of claim 1, wherein the one or more processor-based systems comprise one or more servers in communication with the sensor network and the robot over a network.

4. The robot navigation system of claim 1, wherein the historical human activity data comprises human activity data acquired over at least a week and encompasses one or both of daily trends and hourly trends in human activity.

5. The robot navigation system of claim 1, wherein the path data between the plurality of locations comprises path data between high-traffic locations within the environment.

6. The robot navigation system of claim 5, wherein the high traffic locations comprise one or more of stairs, elevators, conference rooms, lobbies, restrooms, or doorways.

7. The robot navigation system of claim 1, wherein the one or more processor-based systems are configured to derive the path data between the plurality of locations by:
generating one or more representations of monitored human activity using the historical human activity data;
modeling human activity at the plurality of locations based on the one or more representations of monitored human activity;
generating one or more cost maps based on the human activity; and
deriving the path data between the plurality of locations using the one or more cost maps.

8. The robot navigation system of claim 7, wherein the one or more representations of monitored human activity comprise heat maps.

9. The robot navigation system of claim 7, wherein modeling the human activity at the plurality of locations comprises generating Hidden Markov Models.

10. The robot navigation system of claim 7, wherein the one or more cost maps comprise a reactive key cost map for each floor of the environment.

11. A method for navigating a robot in an environment shared with humans, comprising:
acquiring, via a sensor network external to the robot, historical human activity data within the environment over time;
deriving, via one or more processor-based systems, path data between a plurality of locations within the environment based on the historical human activity data, wherein the path data includes outputs of a cost function with respect to moving the robot along respective paths between the plurality of locations within the environment, wherein the robot is configured to perform one or more tasks at a subset of the plurality of locations within the environment; and on the robot:
- receiving the path data generated from the historical human activity data;
- generating, based on the path data, a plurality of waypoints defining a low cost path between the subset of the plurality of locations that mitigates movement of the robot through expected locations of high human traffic within the environment;
- instructing the robot to move along the plurality of waypoints sequentially and to perform the one or more tasks at some or all of the plurality of waypoints; and
- adjusting movement of the robot along the plurality of waypoints based on real-time sensor data acquired by one or more sensors of the robot.

12. The method of claim 11, wherein the historical human activity data comprises human activity data acquired over at least a week and encompasses one or both of daily trends and hourly trends in human activity.

13. The method of claim 11, wherein the path data comprises path data between high-traffic locations within the environment.

14. The method of claim 11, wherein deriving the path data between the plurality of locations within the environment comprises:
- generating one or more representations of monitored human activity using the historical human activity data;
- modeling human activity at the plurality of locations based on the one or more representations of monitored human activity;
- generating one or more cost maps based on the human activity; and
- deriving the path data between the plurality of locations using the one or more cost maps.

15. A robot, comprising:
one or more sensors;
a driving system configured to propel the robot through an environment to enable the robot to perform one or more tasks at a subset of a plurality of locations within the environment; and
a processing component configured to:
- receive path data from an external source, wherein the path data includes outputs of a cost function with respect to moving the robot along respective paths between the plurality of locations within the environment, wherein the path data is generated from historical human activity data acquired by a sensor network external to the robot and positioned within the environment;
- generate, based on the path data, a plurality of waypoints defining a low cost path between the subset of the plurality of locations that mitigates movement of the robot through expected locations of high human traffic within the environment;
- communicate instructions to the driving system to cause the robot to move along the plurality of waypoints sequentially; and
- adjust movement of the robot along the plurality of waypoints based on real-time sensor data acquired by the one or more sensors of the robot.

16. The robot of claim 15, wherein the historical human activity data comprises human activity data acquired over at least a week and encompasses one or both of daily trends and hourly trends in human activity.

* * * * *